United States Patent
Chiniwalla et al.

(10) Patent No.: US 7,480,429 B1
(45) Date of Patent: Jan. 20, 2009

(54) CHIP TO CHIP OPTICAL INTERCONNECT

(75) Inventors: Punit P. Chiniwalla, Ann Arbor, MI (US); Philip Hobbs, Briarcliff Manor, NY (US); Theodore G. van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/770,299

(22) Filed: Jun. 28, 2007

(51) Int. Cl.
*G02B 6/34* (2006.01)
*H04J 14/02* (2006.01)

(52) U.S. Cl. .............. 385/37; 385/14; 385/42; 385/43; 385/129; 385/130; 385/131; 398/50; 398/56; 398/84; 398/87

(58) Field of Classification Search ............ 385/30, 385/31, 37, 14, 42, 43, 49, 50, 88, 89, 92, 385/129, 130, 131, 132; 398/84, 87, 118, 398/130, 141
See application file for complete search history.

(56) References Cited

U.S. PATENT DOCUMENTS

| | | | |
|---|---|---|---|
| 6,625,356 B2 * | 9/2003 | Ticknor et al. | 385/39 |
| 6,870,991 B2 * | 3/2005 | Ohta et al. | 385/50 |
| 7,162,124 B1 * | 1/2007 | Gunn et al. | 385/37 |
| 7,184,625 B2 * | 2/2007 | Gunn et al. | 385/37 |
| 2005/0219546 A1 * | 10/2005 | Otsuka | 356/499 |
| 2006/0239605 A1 * | 10/2006 | Palen et al. | 385/14 |

* cited by examiner

*Primary Examiner*—Brian M Healy
(74) *Attorney, Agent, or Firm*—Perman & Green, LLP

(57) ABSTRACT

An apparatus for optical communication is provided. The apparatus includes a first waveguide formed on a first surface and a second waveguide formed on a second surface. The first and second surfaces are bonded together to form an air gap between the first and second surfaces and diffraction gratings of the first and second waveguides are facing each other. A third waveguide is formed on a third surface, and the third surface is bonded to the second surface so an air gap exists between the third and second surface and diffraction gratings of the third and second wave guides face each other. The light beam passes from the second wave guide across the air gap and into the third waveguide.

22 Claims, 4 Drawing Sheets

CHIP TO CHIP OPTICAL INTERCONNECT

BACKGROUND

1. Field

The present embodiments relate to optical connections and, more particularly, to optical connections between microchips.

2. Brief Description of Related Developments

Large symmetric multiprocessor machines such as blade servers are running out of bandwidth for blade-to-blade, module-to-module and eventually chip-to-chip interconnections. The bandwidth required for these interconnections is growing more rapidly than Moore's law because this bandwidth is the product of the increasing number of processors, the increasing complexity of each processor and the increasing clock speed of those processors. In order to build a complete optical interconnection hierarchy several levels of connections should be addressed. The optical signal travels from the chip to the module, from the module to the board, from the board to the backplane, across the backplane and then back through these levels in the reverse order.

In conventional mainframe and high-end applications, chips interconnect via a substrate using controlled collapse chip connection (C4 or flip chip) bonding. The substrate may be, for example, a glass ceramic multichip module or silicon interposer. Chip to chip electrical connections flow from a chip through the C4 interconnect to the multichip module and then back through the C4 interconnect to the next chip. These C4 electrical connections are not sufficient to accommodate the necessary increase in bandwidth.

Existing optical connections rely on multimode waveguides or multimode fibers because the large cores of multimode waveguides do not require tight mechanical tolerances during assembly, the losses within the short range between chips is negligible and the sources are often multimode. These existing optical connections use volume holographic gratings that are not a feasible manufacturing approach to the problem of the increasing bandwidth requirements because these volume holographic gratings cannot be easily created using microlithography.

It would be advantageous to replace some of the chip to chip electrical connections with easily manufactured optical connections to allow higher speeds over chip to chip distances.

SUMMARY

In one exemplary embodiment, a method for chip to chip communication is provided. The method includes forming a first waveguide on a first surface, forming a second waveguide on a second surface, bonding the first surface to the second surface so an air gap exists between the first and second surface and diffraction gratings of the first and second wave guides face each other and passing a light beam through the first waveguide, across the air gap and into the second waveguide. A third waveguide is formed on a third surface, and the third surface is bonded to the second surface so an air gap exists between the third and second surface and diffraction gratings of the third and second wave guides face each other. The light beam passes from the second wave guide across the air gap and into the third waveguide.

In another exemplary embodiment, an apparatus for optical communication is provided. The apparatus includes a first waveguide formed on a first surface and a second waveguide formed on a second surface. The first and second surfaces are bonded together to form an air gap between the first and second surfaces and diffraction gratings of the first and second waveguides are facing each other. A third waveguide is formed on a third surface. and the third surface is bonded to the second surface to form an air gap between the first and second surface and diffraction gratings of the third and second wave guides face each other.

In one exemplary embodiment, an apparatus for optical chip to chip communication is provided. The apparatus includes a first waveguide formed on an outer area of a first surface and a second waveguide formed on an outer area of a second surface. The second waveguide has at least two diffraction grating sections. A third waveguide is formed on an outer area of a third surface. The first and third surfaces are bonded to the outer area of the second surface so an air gap exists between the outer areas of the first and second surfaces and the third and second surfaces. A diffraction grating section of the first waveguide faces a first diffraction grating of the second waveguide and a diffraction grating of the third surface faces a second diffraction grating of the second surface.

In still another exemplary embodiment, an apparatus for optical chip to chip communication is provided. The apparatus includes a first waveguide formed on a first surface and a second waveguide formed on a second surface. The first and second surfaces are bonded together to form an air gap between the first and second surfaces. The diffraction gratings of the first and second waveguides are facing each other and the first waveguide has three elements. A third waveguide is formed on a third surface and the third and second surfaces are bonded together to form an air gap between the first and second surfaces. The diffraction gratings of the third and second waveguides face each other. The third waveguide has three elements.

BRIEF DESCRIPTION OF THE DRAWINGS

The foregoing aspects and other features of the present embodiments are explained in the following description, taken in connection with the accompanying drawings, wherein.

DETAILED DESCRIPTION OF THE EXEMPLARY EMBODIMENT(s)

Figure 1:
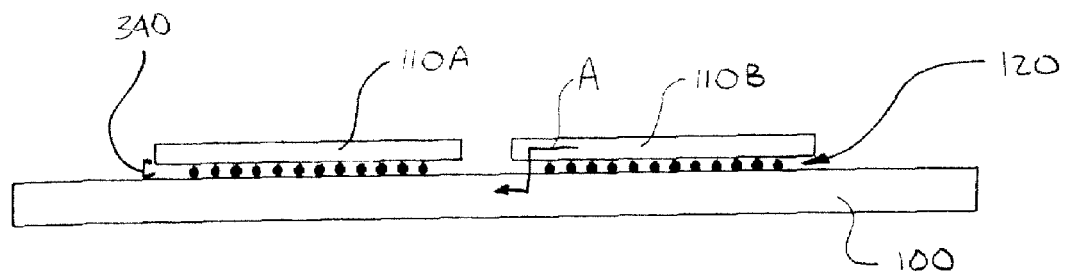
FIG. 1 shows a chips in accordance with an exemplary embodiment bonded to a substrate.

FIG. 1 illustrates silicon chips bonded to a substrate. Although the present embodiments will be described with reference to the exemplary embodiments shown in the drawings and described below, it should be understood that the present embodiments could be embodied in many alternate forms of embodiments. In addition, any suitable size, shape or type of elements or materials could be used.

Figure 4A:
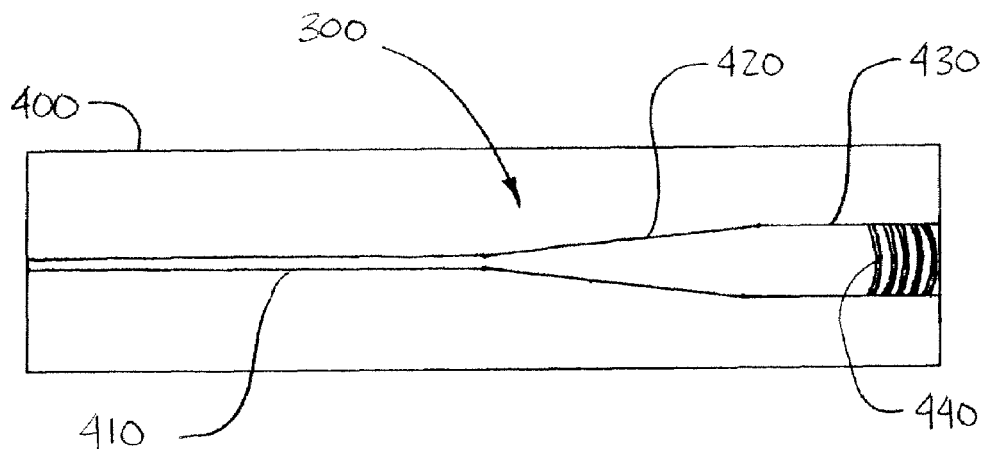
FIGS. 4A and 4B illustrate a top and side view of a waveguide in accordance with an exemplary embodiment.
Figure 4B:
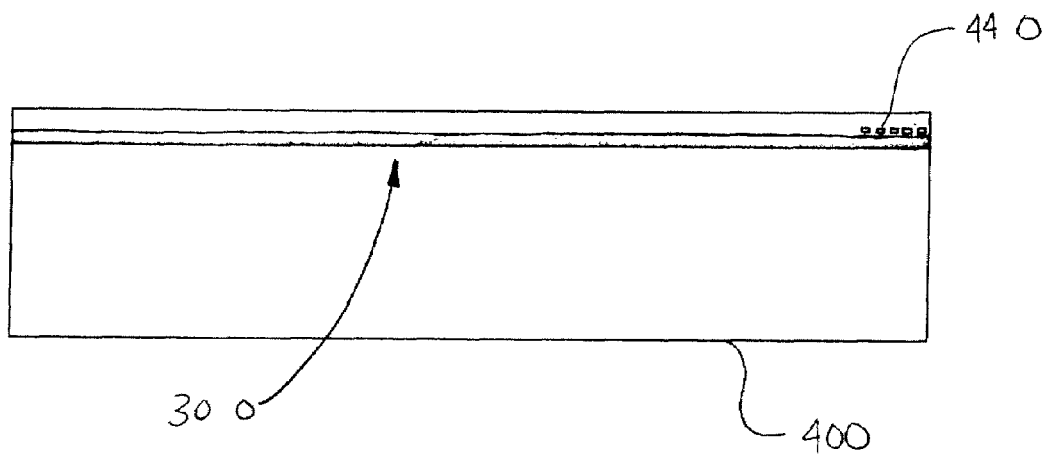
Figure 5:
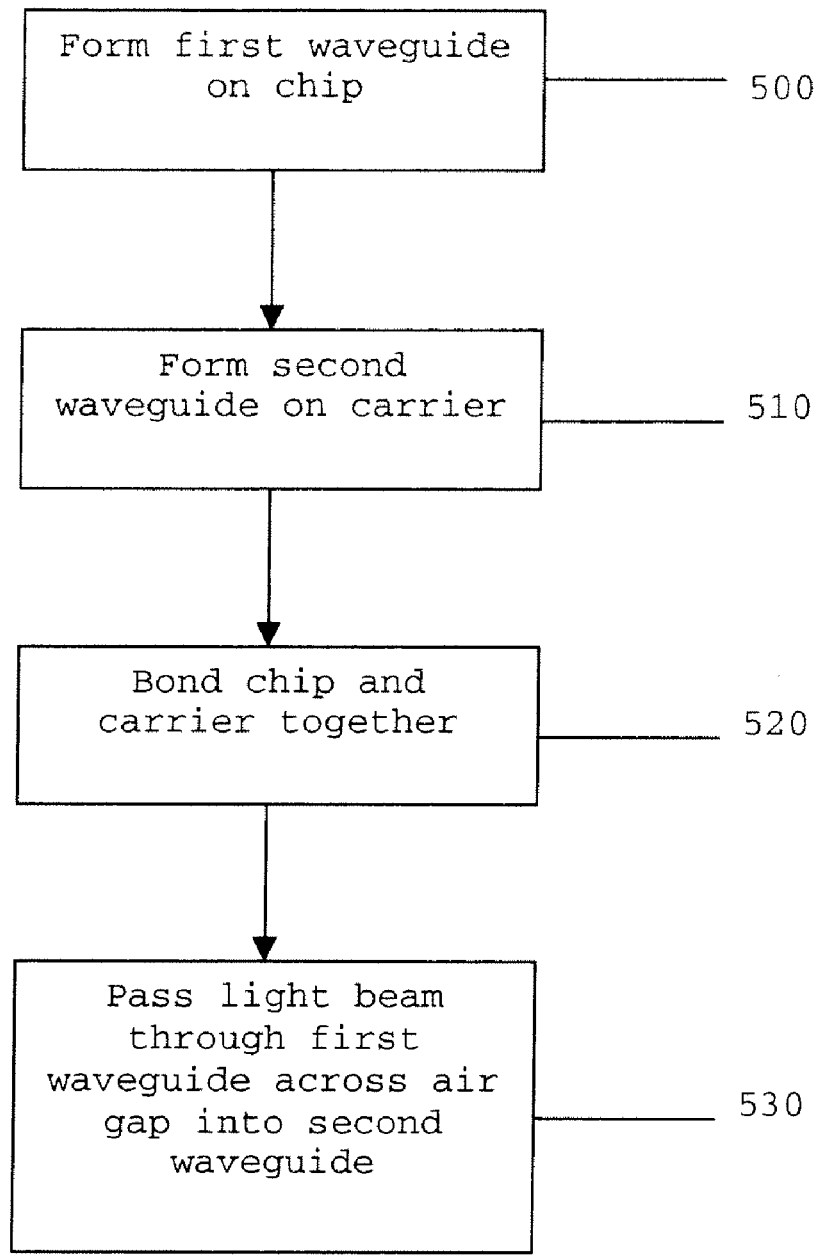
FIG. 5 illustrates a flow diagram of a method in accordance with an exemplary embodiment.

The chips 110A and 110B and the multichip module, carrier or interposer 100 may contain the waveguide 300 of FIGS. 4A and 4B. The waveguide 300 may be fabricated on, for example, the device side or C4 mounting surface of a substrate 400 by any suitable method such as lithographic thin film methods (FIG. 5, Blocks 500 and 510). The device side of the substrate 400 such as the chips 110A, 110B or the carrier 100 may be available for the disclosed waveguides and is unobstructed by heatsinks, thermal hats or grease. In alternate embodiments the waveguide 300 may be formed on any suitable surface of the substrate 400. In one embodiment, the waveguide 300 is not embedded in the corresponding structure on three sides. The waveguide 300 is formed on a top or outer surface of the respective structure, which can include for example a chip, module, carrier, interposer or other suitable structure.

The waveguide 300 may be made of any suitable material capable of transmitting light, such as for example silicone, silicon/SiO2 or a polymer.

Figure 2:
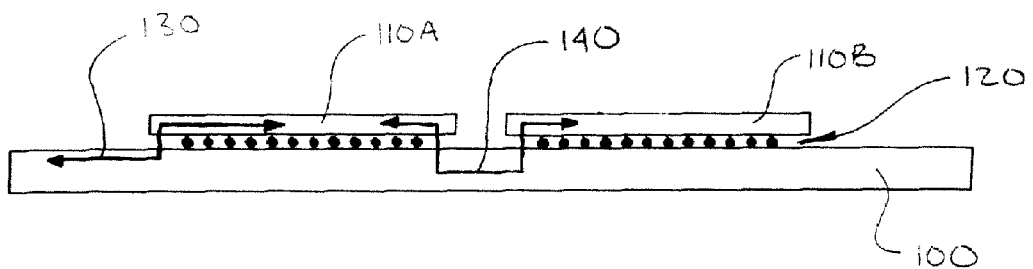
FIG. 2 illustrates an optical interconnect routing in accordance with an exemplary embodiment.

The waveguide 300 may be a multimode waveguide or any other suitable waveguide. The waveguide 300 may include a rectangular waveguide 410 and a grating terminal or section 430 that are longitudinally connected by a tapered waveguide 420. The rectangular waveguide 410 may have, for example, a width of about 0.4 microns. The tapered waveguide 420 may, for example, extend longitudinally away from the rectangular waveguide 410 while expanding the lateral dimension of the rectangular waveguide by, for example, approximately twenty degrees to mate with the grating terminal or section 430. The grating section 430 may be, for example, approximately ten microns wide and approximately ten microns long. In alternate embodiments the waveguide 300 and its sections 410-430 may have any suitable shape, dimensions and/or configuration. The grating terminal 430 may contain diffraction gratings 440 having a directional selectivity to send the propagated light in and out of the chip in the direction of 100A, 110B rather than into the body of chip 110A, 110B. For example, as shown in FIG. 2, the gratings 440 of a waveguide 300 in chip 110B may send the propagated light out of the chip 110B in the direction 130 and into a waveguide 300 in the carrier 100. The diffraction gratings 440 may be, for example, two-dimensional gold gratings formed by any suitable method such as, for example, lithography, dual damascene, etching, chemical-mechanical planarization or any combination thereof. The gratings 440 may be made of a single metal layer or any suitable number of layers. The gratings 440 may be, for example, blazed gratings (i.e. gratings with a nonsymmetrical line profile) that provide directional selectivity formed with dual Damascene technology in which two or more metal layers are directly adjacent to each other and patterned separately. In alternate embodiments, the gratings 440 may be tuned so that electrical or magnetic fields induced within the gratings 440 exhibit phase shifts (i.e. metal tuning). The interaction of these phase shifts with asymmetric vertical placement of the metal in the waveguide 300 may provide directional selectivity in a way similar to the copper ring (e.g. the shading-coil) of a shaded-pole AC motor.

The waveguide 300 may propagate any suitable wavelength of light such as for example the infrared 1.5 micron or 3 micron communication wavelengths. In alternate embodiments the waveguide 300 may be configured through suitable material choices to propagate visible light.

The chips 110A and 110B containing the wave guide 300 may be bonded to the carrier 100, which also contains a waveguide 300, in any suitable manner such as by C4 connection 120 (FIG. 5, Block 520). The C4 connections 120 are solder balls placed on corresponding contact pads of the chips 110A, 110B and the carrier 100. As heat is applied, the solder melts and flows causing the chips 110A, 110B to be bonded to the carrier 100. These bonds formed by the solder balls form the electrical connections between the contact pads of the chips 110A, 110B and the contact pads of the carrier 100. The C4 bonding process limits the lateral and vertical alignment error of the chips 110A and 110B to approximately +/−1.0 micron. The C4 bonding process also produces an air gap 340 between chips of approximately 50 microns.

Figure 3:
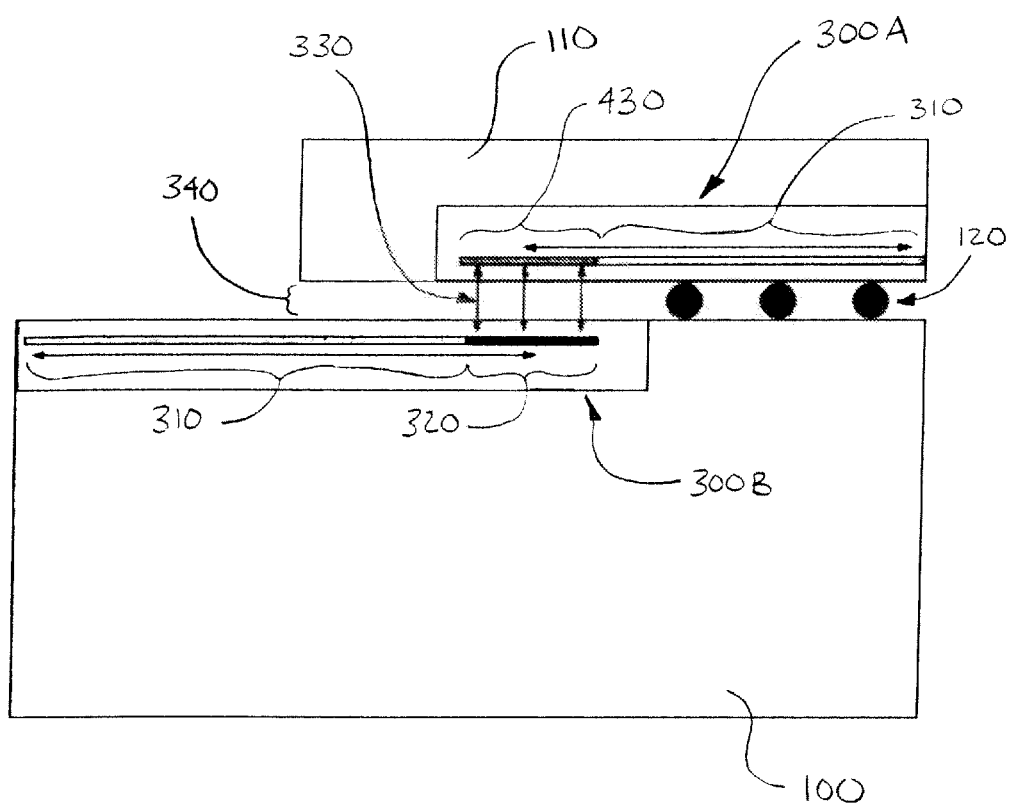
FIG. 3 shows a side view of the optical interconnect of FIG. 2.

Referring to FIG. 3, as the chip 110 is bonded to the carrier 100, the inherent lateral and vertical alignment properties of the C4 connection permit the grating terminals or regions 430 of the waveguides 300A, 300B in the chip 110 and in the carrier 100 respectively to be in alignment. In essence, the optical connection between the chip 110 and the carrier 100 is an "optical C4" connection that is capable of being interspersed with ordinary solder C4's without requiring any special alignment or preparation beyond what is already used in, for example, fluxless C4 bonding. Although, in this example, the C4 connection is used to describe the bonding between the chip 110 and the carrier 100, any suitable bonding method having sufficient alignment properties can be used.

As noted above, for each optical connection two waveguides 300A, 300B are used in pairs and oriented to face each other across the gap 340 as shown in FIG. 3. One waveguide 300A is, fabricated on the device or bonding side of the chip 110 while the other is similarly fabricated on a corresponding side of the carrier 100. Because the two waveguides 300A, 300B communicate via the free space or air gap 340, the waveguide technologies can be different in the chip 100 and the carrier 100. For example, a silicon/SiO2 waveguide on the chip 110 could communicate with a polymer waveguide on the carrier 100.

In the exemplary configuration shown in FIG. 2, the light 330 propagates laterally through the waveguides on the chips 110A, 110B and the carrier 100. To bridge the air gap 340 the light makes a ninety-degree bend via the gratings 440. When the light 330 crosses the gap 340 it enters the gratings 440 of the corresponding waveguide and makes another ninety-degree bend. Arrows 130 and 140 indicate the path of light travel in this exemplary embodiment. The light 330 crossing the air gap 340 may have, for example, a waist at a point between the two interacting surfaces (e.g. gratings 440) of the wave guides 300A, 300B so that the coupling loss has a broad minimum at the expected separation between the chip 100 and the carrier 100.

By expanding the guided light beam 330 in the exit region up to a sufficient diameter, such as for example, a 10 or 20 micron diameter that is focused some distance away from the surface, the alignment tolerances of the chip/carrier bonding process are accommodated. In addition, the light beam may be configured so that uncertainties in the distance between the chip 110 and the carrier 100 (i.e. the air gap 340) due to variations in the solder volume in each C4 joint are within the depth of focus of the beam 330 leaving the exit region.

In operation, for example, light enters the waveguide structure 300A in the chip 110 via the rectangular waveguide 410 section. The rectangular waveguide section mates with a grating terminal or section 430 through the tapered waveguide 420 section. As shown in FIG. 3, the rectangular waveguide 410 and tapered waveguide 420 are shown as section 310. As the light enters the grating section 430 it interacts with the two-dimensional diffraction grating 440 that bends the light ninety-degrees and sets the state of focus of the beam. The light beam 330 traverses the air gap 340 and enters the grating section 320 of the corresponding waveguide 300B where it is bent ninety-degrees and coupled to the waveguide 300B for propagation through the carrier 100 for subsequent transmission to another chip (FIG. 5, Block 530). Both ends of the waveguide 300B in the in the carrier 100 may have substantially the same diffraction gratings so that the light beam 330 is passed from chip to chip through the waveguide 300B. Light beam 330 transmission from the carrier 100 to the chip 110 occurs in substantially the opposite way as described above for light beam transmission from the chip 110 to the carrier 100 (e.g. light propagation is bi-directional). The two gratings 430, 320 may have non-uniform spacing in general, because the field exiting the tapered region may have curved phase fronts and because the focusing of the light beam 330 may entail a quadratic phase change across the exit region.

The disclosed embodiments may provide a cost effective, easily manufactured and practical method of bringing optical signals to and from a multichip module from outside the module as well as from chip to chip.

It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method for chip to chip communication, the method comprising:
   forming a first waveguide on a first surface;
   forming a second waveguide on a second surface;
   bonding the first surface to the second surface so an air gap exists between the first and second surface and diffraction gratings of the first and second wave guides face each other;
   passing a light beam through the first waveguide, across the air gap and into the second waveguide;
   forming a third waveguide on a third surface; and
   bonding the third surface to the second surface so an air gap exists between the third and second surface and diffraction gratings of the third and second wave guides face each other;
   wherein the light beam passes from the second wave guide across the air gap and into the third waveguide.

2. The method of claim 1, wherein the first and third surfaces comprise microchips.

3. The method of claim 1, where the first surface and second surface are bonded by controlled collapse chip connection.

4. The method of claim 1 wherein forming the first and second waveguides comprises:
   forming a rectangular waveguide and a diffraction grating terminal connected by a tapered waveguide;
   wherein the rectangular waveguide and tapered waveguide are formed by lithography.

5. The method of claim 4, wherein the diffraction gratings are formed by a dual damascene process.

6. The method of claim 1 wherein the diffraction gratings are metal tuned.

7. The method of claim 1 further comprising the first waveguide and second waveguide being formed on a top surface area of the first surface and second surface, respectively.

8. An apparatus for optical communication comprising:
   a first waveguide formed on a first surface; and
   a second waveguide formed on a second surface;
   wherein the first and second surfaces are bonded together to form an air gap between the first and second surfaces and diffraction gratings of the first and second waveguides are facing each other; and
   a third waveguide formed on a third surface;
   wherein the third and second surfaces are bonded together to form an air gap between the first and second surfaces and diffraction gratings of the third and second waveguides are facing each other.

9. The apparatus of claim 8 wherein the waveguides are configured so the first waveguide and third waveguides are in communication with each other via the second waveguide.

10. The apparatus of claim 8, wherein the first and third surfaces comprise a microchip.

11. The apparatus of claim 8, wherein the first and second waveguides comprise at least:
    a rectangular waveguide section;
    a diffraction grating terminal; and
    a tapered waveguide section longitudinally connecting the rectangular waveguide to the diffraction grating terminal.

12. The apparatus of claim 11 wherein the rectangular waveguide section comprises a 0.4 micron dimension, the tapered waveguide section is tapered laterally 20 degrees and the diffraction grating terminal is 10 microns wide and 10 microns long.

13. The apparatus of claim 8, wherein the first waveguide comprises silicon or a polymer and second waveguide comprises silicon or a polymer.

14. The apparatus of claim 8, wherein the diffraction gratings comprise a two-dimensional diffraction grating made of a single metal layer.

15. The apparatus of claim 8, wherein the diffraction gratings of the first and second waveguides have non-uniform spacing.

16. The apparatus of claim 8 further comprising the first waveguide and the second waveguide being formed on a top surface area of the first surface and the second surface, respectively.

17. An apparatus for optical chip to chip communication comprising:
    a first waveguide formed on an outer area of a first surface;
    a second waveguide formed on an outer area of a second surface, the second waveguide having at least two diffraction grating sections; and
    a third waveguide formed on an outer area of a third surface;
    wherein the outer areas of the first and third surfaces are bonded to the outer area of the second surface so an air gap exists between the outer areas of the first and second surfaces and the third and second surfaces, a diffraction grating section of the first waveguide is facing a first diffraction grating of the second waveguide and a diffraction grating of the third surface is facing a second diffraction grating of the second surface.

18. An apparatus for optical chip to chip communication comprising:
    a first waveguide formed on a first surface; and
    a second waveguide formed on a second surface;
    wherein the first and second surfaces are bonded together to form an air gap between the first and second surfaces and diffraction gratings of the first and second waveguides are facing each other, the first waveguide having three elements; and
    a third waveguide formed on a third surface;
    wherein the third and second surfaces are bonded together to form an air gap between the first and second surfaces and diffraction gratings of the third and second waveguides are facing each other, the third waveguide having three elements.

19. The apparatus of claim 18, wherein the first, second and third waveguides comprise at least:

a rectangular waveguide section;

a diffraction grating terminal; and a tapered waveguide section longitudinally connecting the rectangular waveguide to the diffraction grating terminal.

20. The apparatus of claim 17 wherein the waveguides are configured so the first waveguide and third waveguides are in communication with each other via the second waveguide.

21. The apparatus of claim 17, wherein the first and second waveguides comprise at least:

a rectangular waveguide section;

a diffraction grating terminal; and a tapered waveguide section longitudinally connecting the rectangular waveguide to the diffraction grating terminal.

22. The apparatus of claim 17 further comprising the first waveguide and the second waveguide being formed on a top surface area of the first surface and the second surface, respectively.

* * * * *